No. 637,783. Patented Nov. 28, 1899.
J. HERFERT.
ANIMAL TRAP.
(Application filed Dec. 9, 1898.)
(No Model.) 2 Sheets—Sheet 1.
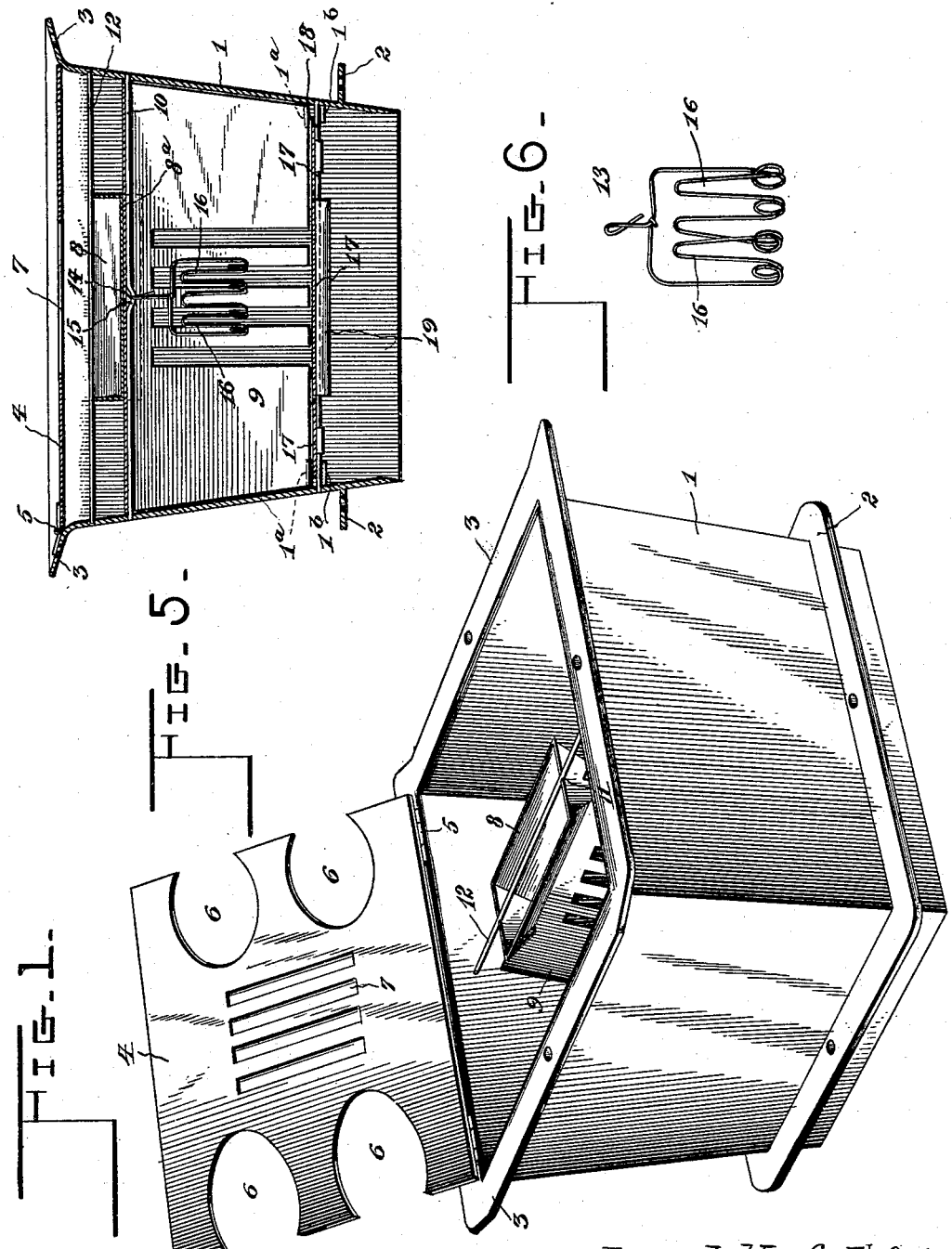
Witnesses Joseph Herfert Inventor
By his Attorneys, No. 637,783. Patented Nov. 28, 1899.
J. HERFERT.
ANIMAL TRAP.
(Application filed Dec. 9, 1898.)
(No Model.) 2 Sheets—Sheet 2.
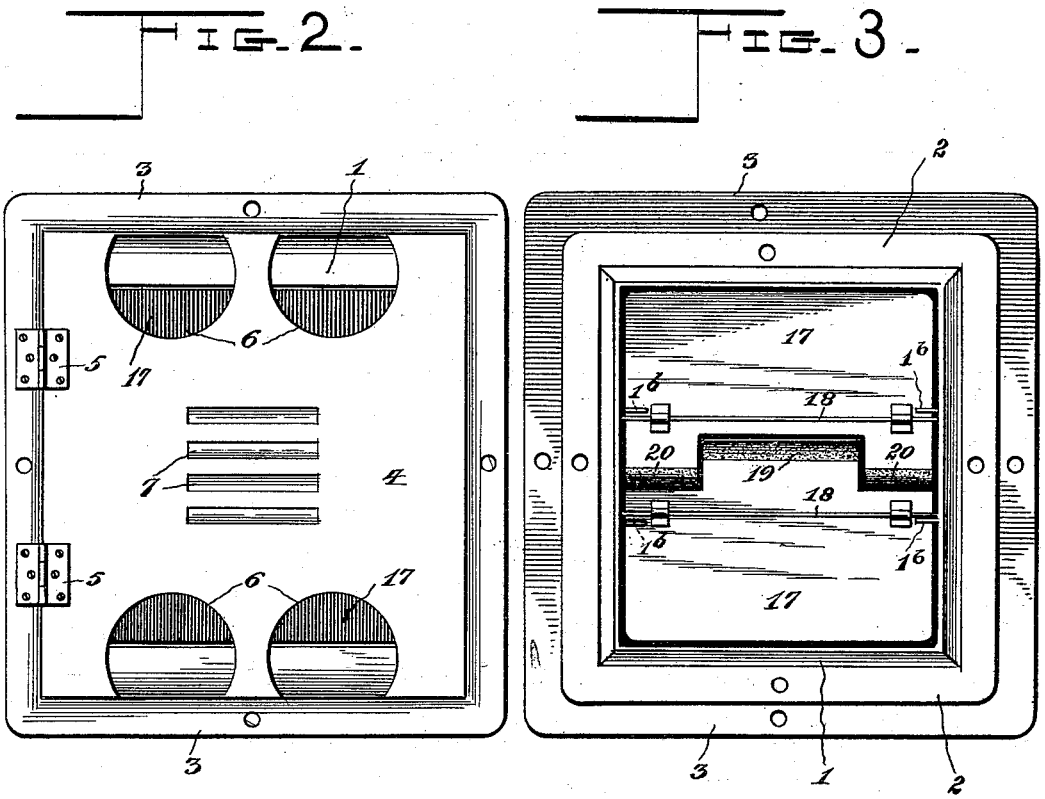
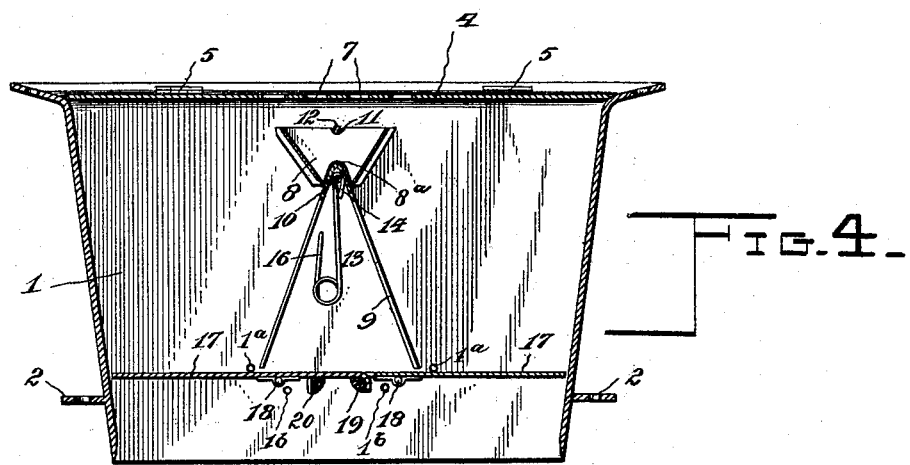
Witnesses
Joseph Herfert, Inventor
By his Attorneys,

UNITED STATES PATENT OFFICE.

JOSEPH HERFERT, OF TUCKER, WASHINGTON.

ANIMAL-TRAP.

SPECIFICATION forming part of Letters Patent No. 637,783, dated November 28, 1899.

Application filed December 9, 1898. Serial No. 698,769. (No model.)

*To all whom it may concern:*

Be it known that I, JOSEPH HERFERT, a citizen of the United States, residing at Tucker, in the county of Cowlitz and State of Washington, have invented a new and useful Animal-Trap, of which the following is a specification.

The invention relates to improvements in animal-traps.

The object of the present invention is to improve the construction of self-set and ever-set animal-traps, and to provide a simple, inexpensive, and efficient one which will be positive and reliable in operation, and in which the bait will not have to be replenished.

The invention consists in the construction and novel combination and arrangement of parts, as hereinafter fully described, illustrated in the accompanying drawings, and pointed out in the claims hereto appended.

In the drawings, Figure 1 is a perspective view of a trap constructed in accordance with this invention, the hinged top being swung upward. Fig. 2 is a plan view. Fig. 3 is a reverse plan view. Fig. 4 is a vertical sectional view taken centrally through the trap. Fig. 5 is a similar view taken at right angles to Fig. 4. Fig. 6 is a detail perspective view of the lower bait-holder.

Like numerals of reference designate corresponding parts in all the figures of the drawings.

1 designates a casing constructed of sheet metal or other suitable material and provided on its exterior, near its bottom, with a horizontal supporting ledge or flange 2 and designed to be placed over a cage or receptacle for the reception of the captured animals. The casing may be rectangular, round, or any other shape in cross-section, and it can be suspended within or placed upon the receptacle for captured animals, and such receptacle may be supplied with a sufficient quantity of water to drown the animals as they are captured.

The inner walls or sides of the casing are preferably arranged at an inclination, as illustrated in the accompanying drawings, and are designed to be provided with smooth inner faces of enamel or other rust-proof coating to prevent any of the captured animals from obtaining a foothold on such sides. The top of the casing is provided with a flange or rim 3, and it has a cover or lid 4, forming a top, and connected to one side of it by hinges 5; but the top may be mounted on the casing in any other suitable manner. The top is provided at opposite sides with openings 6 to permit animals to enter the trap, and it has an open-work central portion 7, located directly above a bait-receiving trough 8, adapted to contain any suitable material for attracting animals, and as the latter do not obtain access to it it does not have to be frequently replenished, as would be the case were the bait exposed to the animal. The central portion 7 may be formed by slots cut in a tin or other sheet-metal top; but the latter may be formed of woven wire or any other suitable material.

The bait-trough, which has oppositely-inclined sides, is provided at its bottom with an inwardly-extending substantially V-shaped bend or groove 8ª, forming a seat, and the trough is mounted upon a central inverted-V-shaped partition 9, composed of two downwardly-converging sides or portions and separating the trap or casing into two compartments. The central partition, which may be constructed of sheet metal, woven wire, or any other suitable material, is supported by a horizontal rod 10, which is arranged within the crotch formed by the inclined sides. The ends of the trough are provided at their upper edges with alined notches 11, in which is arranged a horizontal rod 12, disposed parallel with the rod 10 and located above the same.

Within the space between the inclined sides of the central partition is arranged a wire bait-holder 13, provided at its top with a hook 14, which engages a bend 15 of the horizontal rod 10. The bait-holder, which is preferably constructed of a single piece of wire, is composed of a substantially rectangular frame and a series of resilient fingers or tongues 16, extending upward at opposite sides of the bait-holder and forming a receptacle for a suitable bait. The bait-holder may be made of any desired size; but, as illustrated in the accompanying drawings, the wire is bent or doubled to form a central tongue and is coiled at opposite sides of the same and then bent to form side tongues, the central tongue being located opposite the interval between the side tongues. The side tongues, which are located adjacent to the sides of the frame, are connected with the same by spring-coils. The resilient tongues, which extend upward from the spring-coils, may be of any desired number, and those at one side will be located opposite the intervals of those at the other side of a bait-holder.

The bait-trough contains a bait designed for attracting animals to the trap, and the lower bait-holder is adapted for drawing animals into the same. When the animals discover that it is impossible to obtain access to the bait from the exterior of the trap, they will enter the same and will slide down the sides of the casing to a pair of weighted trap-doors 17, arranged at the bottom of the casing and mounted on pintle-rods 18. The pintle-rods, which are arranged parallel, are located beneath the central partition, and the animals entering the trap are received upon the outer portions of the trap-doors, which open and precipitate the animals into the cage or receptacle upon which the casing is mounted. One of the trap-doors is provided at its inner end with a central weighted extension 19, and the other trap-door is provided at its inner end with weighted side extensions 20, located at opposite sides of the central extension 19 and separated from the same by a slight intervening space to prevent the trap-doors from binding against each other.

The inclined sides of the central partition are provided at points opposite the lower bait-holder with openings for exposing the bait to enable the same to be readily seen by animals on top of the casing to entice them within the same.

The flanges 2 and 3 are provided with perforations to enable the casing of the trap to be readily secured to boards or strips for supporting the said casing within a vessel considerably larger than the same. Cords or any other suitable fastening devices may be employed for securing the strips or boards to the flanges. The casing is provided on its interior with suitable stops 1$^a$ and 1$^b$, located above and below the trap-doors 17, to limit the swing thereof, as clearly illustrated in Fig. 4 of the accompanying drawings; but instead of locating the stops 1$^a$ and 1$^b$ on the same side of the casing, as shown, they may be located at opposite sides thereof or they may be arranged at each side.

The invention has the following advantages: The trap, which is exceedingly simple and inexpensive in construction, is strong and durable and not liable to be broken or to get out of order. The casing may be supported upon or placed within a vessel or receptacle or it may be mounted upon a suitable cage for the reception of the captured animals. The animals do not obtain access to the bait, so that the latter does not have to be replenished at short intervals. The upper bait is adapted to attract animals to the trap and the lower one entices them within the casing, so that the trap is exceedingly effective. After an animal enters the casing it is impossible for it to escape therefrom.

Changes in the form, proportion, and minor details of construction may be resorted to without departing from the spirit or sacrificing any of the advantages of this invention.

What is claimed is—

1. A trap comprising a casing, a top having an entrance-opening, an upper bait-holder located immediately beneath the top, a lower bait-holder arranged within the casing at a point beneath the upper bait-holder, and a hinged door arranged at the bottom of the casing, substantially as described.

2. A trap comprising a casing having a top provided at opposite sides with openings and having a central open portion, a bait-holder located beneath the central open portion of the top, a partition arranged within the casing and dividing the same into two compartments, and automatically-closing trap-doors arranged at the bottom of the casing, substantially as described.

3. A trap comprising a casing having a top with entrance-openings, said top being provided with openings or apertures, a trough adapted to contain a bait and arranged beneath the openings or apertures at the center of the top, a partition supporting the trough, and trap-doors arranged at the bottom of the casing, substantially as described.

4. A trap comprising a casing provided at the top with apertures and having an entrance, a trough or receptacle arranged beneath the apertures and adapted to contain a bait, and a trap-door located beneath the top of the casing, substantially as described.

5. A trap comprising a casing, a partition arranged within the casing and dividing the same into two compartments, said partition being provided with an interior space or compartment adapted to receive a bait, and a top having entrance-openings, substantially as described.

6. A trap comprising a casing, a substantially inverted-V-shaped partition arranged within the casing and dividing the same into compartments and forming a central bait-receiving space, a trough seated upon the apex of the partition, and a top having entrance-openings, substantially as described.

7. A trap comprising a casing, an inverted-V-shaped partition mounted in the casing and dividing the same into compartments and adapted to receive a bait between its sides, a bait-receiving trough provided at its bottom with a V-shaped bend or groove forming a seat and arranged upon the partition, and a top having apertures located above the trough, substantially as described.

8. A trap comprising a casing, a substantially inverted-V-shaped partition arranged within the casing, a horizontal rod located within the crotch of the partition and supporting the same, a bait-receiving trough seated upon the partition and provided at its end with recesses or openings, a rod passing through the recesses or openings of the trough and retaining the latter on the partition, and a top having entrance-openings, substantially as described.

9. A trap comprising a casing, a horizontal rod arranged within the casing and having a bend, a partition composed of two sides and suspended from the rod, a bait-holder arranged between the sides of the partition and having a supporting device engaging the said bend, and a top having entrance-openings, substantially as described.

10. A trap provided with a bait-holder constructed of resilient material and comprising a frame, resilient fingers located at opposite sides of the bait-holder and adapted to support a bait, and spring-coils connecting the fingers with each other and with the frame, substantially as described.

11. A trap provided with a bait-holder comprising a series of substantially U-shaped fingers located at opposite sides of the holder, the fingers at one side being located opposite the intervals of the fingers at the other side, spring-coils arranged at the side of the fingers and connecting the same, and a frame connected with the end coils, substantially as described.

In testimony that I claim the foregoing as my own I have hereto affixed my signature in the presence of two witnesses.

JOSEPH HERFERT.

Witnesses:
  JOHN LEVVELL,
  ESPY STUDEBEKER.